United States Patent [19]
deNeuf et al.

[11] Patent Number: 5,347,423
[45] Date of Patent: Sep. 13, 1994

[54] TRIMMABLE COMPOSITE MULTILAYER CAPACITOR AND METHOD

[75] Inventors: Joel B. deNeuf, State College; Bruce E. Helms, Warrior's Mark; Delmont L. Billotte, Madisonburg, all of Pa.

[73] Assignee: Murata Erie North America, Inc., Smyrna, Ga.

[21] Appl. No.: 934,798

[22] Filed: Aug. 24, 1992

[51] Int. Cl.$^5$ ............................................. H01G 4/10
[52] U.S. Cl. .................... 361/313; 361/271; 361/303; 361/321.2; 29/25.42
[58] Field of Search ............... 361/271, 277, 278, 303, 361/306, 309, 313, 321, 321.1, 321.2, 321.3; 29/25.42

[56] References Cited

U.S. PATENT DOCUMENTS

| | | | |
|---|---|---|---|
| 3,597,579 | 8/1971 | Lumley | 219/121 L |
| 3,921,041 | 11/1975 | Stockman | 361/330 |
| 4,081,901 | 4/1978 | Miller | 437/183 |
| 4,217,570 | 8/1980 | Holmes | 338/308 |
| 4,288,776 | 9/1981 | Holmes | 338/308 |
| 4,338,506 | 7/1982 | Geller et al. | 361/271 |
| 4,371,860 | 2/1983 | May et al. | 338/21 |
| 4,397,886 | 8/1983 | Neirman et al. | 361/321 |
| 4,439,814 | 3/1984 | Rhodes | 361/321 |
| 4,470,096 | 9/1984 | Guertin | 361/277 |
| 4,731,697 | 3/1988 | McLarney | 361/321 |
| 4,747,014 | 5/1988 | Kaino et al. | 361/321 |
| 4,792,779 | 12/1988 | Pond et al. | 388/195 |
| 4,905,358 | 3/1990 | Einbinder | 29/25.42 |
| 4,924,064 | 5/1990 | Stormbom et al. | 219/121.69 |
| 4,928,838 | 5/1990 | Imamura | 219/121.69 |
| 4,990,742 | 2/1991 | Nishikawa et al. | 219/121.69 |
| 5,055,911 | 10/1991 | Orgata | 257/711 |
| 5,065,275 | 11/1991 | Fujisaki et al. | 361/321 |
| 5,081,439 | 1/1992 | Natzle et al. | 338/195 |
| 5,159,524 | 10/1992 | Hasegawa et al. | 361/271 |

Primary Examiner—Bruce A. Reynolds
Assistant Examiner—Gregory L. Mills
Attorney, Agent, or Firm—Hopkins & Thomas

[57] ABSTRACT

In a first embodiment, a trimmable composite multilayer capacitor (10) is fabricated with a novel process so that the capacitor (10) exhibits a high quality factor Q and is capable of efficient and accurate functional trimming over a wide range while in a circuit. The capacitor (10) comprises a capacitor body (12) defined by a plurality of interleaved first and second electrodes (14, 16) spaced apart by dielectric material. The plurality establishes a fixed capacitance value. The plurality is co-fired at a first temperature. A trimmable outermost electrode (14') is disposed on the exterior of the capacitor body (12) and is capable of depletion for particularly selecting the overall capacitance value of the capacitor (10). The trimmable outermost electrode is sintered on the capacitor body (12) at a second temperature which is less than the first temperature. Finally, first and second terminations (24, 26) are positioned at the ends of the capacitor body (12). The first termination is connected to the first electrodes (14) and to the trimmable outermost electrode (14'), whereas the second termination is connected to the second electrodes (16). In a second embodiment, a trimmable outermost electrode is disposed as described above over the capacitor body (12) defined by the plurality of interleaved first and second electrodes (14, 16). Significantly, a solder barrier is situated externally over a portion of the trimmable outermost electrode (14') near the first termination to prevent solder from covering the trimmable outermost electrode.

24 Claims, 4 Drawing Sheets

TRIMMABLE COMPOSITE MULTILAYER CAPACITOR AND METHOD

BACKGROUND OF THE INVENTION

I. Technical Field

The present invention generally relates to discrete electronic circuit elements, and more particularly, to a trimmable composite multilayer capacitor exhibiting a high quality factor (Q).

II. Related Art

For many years, discrete electronic capacitors have been manufactured using multilayer technology. Generally, layers of conductive metallic electrodes are interleaved with layers of a dielectric material, for instance, ceramic, to form a main capacitor body of a multilayer capacitor. A termination, or a conductive contact, is disposed at each end of the capacitor body. Moreover, each termination is connected to an exclusive set of alternate internal electrodes. In effect, the capacitor body responds like a group of capacitors connected in electrical parallel. The parallel connection is effectuated by the common termination interfacing alternate electrodes. The degree of capacitance achieved is a function of the number of interleaved layers, the geometric area and thickness of each layer, and the dielectric constant K of the dielectric layers.

The historical fabrication of multilayer ceramic (MLC) capacitors and some of the most recently developed methods for manufacturing the same are described in, for example, U.S. Pat. No. 5,046,236 to Wada et al. and U.S. Pat. No. 4,835,656 to Kitahara, both of which are incorporated herein by reference as if set forth in full hereinafter. In general, the fabrication of the capacitor body is a lamination process. Ceramic sheets measuring typically around 1.5 mil in thickness are obtained in green form. A thick film of a metallic electrode paste is screen printed on each ceramic sheet. Next, the ceramic sheets are stacked, pressed, cut, and then sintered in a kiln. Finally, the terminations are disposed at each end of the capacitor body by a conventional dipping process wherein the capacitor body is dipped into a liquified metallic solution, such as silver, and then sintered in a kiln. Afterwards, the terminations may be plated by one or more metallic layers, such as a nickel and/or tin plating layer, if desired, to enhance durability, shelf life, and/or surface mounting processes.

The capacitance values of multilayer capacitors typically fall within a 5%–25% tolerance range as fabricated, even with well controlled fabrication processes. However, more precise capacitance values are required in many circuit applications, and in others, it may be necessary to individually adjust capacitance values of components to custom tune a circuit, the components often referred to as "set-and-forget" devices. This is often accomplished via a functional trimming operation in which portions of the metallic layers in the multilayer capacitors are physically removed. Many varieties of trimming systems have been developed for this purpose and are commercially available in the art. Abrasive trimming systems and laser trimming systems are examples. Laser trimming systems have a number of significant advantages compared to the others, including better accuracy, much greater speed, and cleaner operation.

Recently, there has been an increasing demand for trimmable multilayer capacitors which exhibit a high quality factor Q. A high quality factor Q enables low loss performance of the capacitors at high frequencies, for example, up in the gigahertz ($n*10^9$ Hz; GHz) range. Traditionally, in the art, ceramic capacitors with a high quality factor Q are fabricated by selecting Class I dielectric materials ($0<K<100$) having a low dielectric constant K, for example, $K<20$. For instance, a high density alumina ($Al_2O_3$), berylia (BeO), silicon dioxide ($SiO_2$), calcium titanate (CaTi), or magnesium titanate (MgTi), may be used as the dielectric material for this purpose. U.S. Pat. No. 4,470,096 to Guertin, the disclosure of which is incorporated herein by reference, describes a multilayer capacitor which uses a dielectric material comprised of a composite of both silicon dioxide and alumina.

However, the use of dielectric materials having a low dielectric constant K can be problematic in the multilayer capacitor setting. In order to obtain appreciable capacitance, the dielectric layers must be very thin. This predicament makes the multilayer capacitors very difficult to manufacture and can result in unreliable operation. Specifically, if an outermost electrode is disposed externally on the outer surface of such a multilayer capacitor for the purpose of being trimmed, the trimming may undesirably penetrate completely through the outermost electrode and underlying dielectric layer to thereby substantially damage or expose the next underlying electrode. Exposure can result in a short circuit.

Additionally, with the use of a dielectric material having a low dielectric constant K, the volumetric efficiency, which is generally defined in the industry as the capacitance per unit of volume, is substantially compromised. In other words, volumetric efficiency increases with an increase in the dielectric constant K.

A further problem relative to fabricating trimmable multilayer capacitors exhibiting a high quality factor Q involves the efficiency and accuracy at which a trimmable outermost electrode layer can be depleted. More specifically, if all of the electrodes, including the trimmable outermost electrode, are stacked in the green state and are then sintered together, or co-fired, so as to form the capacitor body, the electrode layers and especially the outermost electrode layer will diffuse or migrate to some extent into the dielectric layers. Consequently, when the outermost electrode is trimmed in circuit, much of the electrode material which has migrated into the underlying dielectric material is not or cannot be depleted by the functional trimming operation.

Further, higher trimming power settings to deplete these diffused regions are not desirable because an extreme risk exists of penetrating too deeply, thereby substantially destroying the underlying dielectric layer and/or electrode. Depletion of the underlying dielectric layer decreases the quality factor Q.

Also, after trimming, a discontinuous, nonplanar, diffused region or perhaps even a distribution of varying-sized diffused islands of electrode material may remain behind in the underlying dielectric layer, resulting in stray capacitances of varying values, thus affecting the linearity of the trimming.

Still another problem in manufacturing a trimmable multilayer capacitor is surface mounting. When solder is applied to the terminations, solder can wick up onto the trimmable outermost electrode. This is especially true in the case where an automated surface mounting process is utilized. The solder on the outermost electrode inhibits trimming. With solder on the electrode, it is almost impossible to trim efficiently and accurately.

In order to prevent solder from migrating onto the trimmable outermost electrode, one known design has disposed the outermost electrode in the form of a "floater" electrode. For example, with the traditional multilayer configuration as described above, the floater electrode is fabricated on the exterior of the capacitor body so that it does not touch either termination, and beneath it, there resides two internal electrodes in the same layer spaced slightly apart and connected to opposite terminations. The foregoing configuration results in two capacitances in series connection between the opposing terminations. However, the foregoing configuration is undesirable because the volumetric efficiency is extremely poor in that the series capacitances are only a half of the total capacitance available in an equivalent parallel design.

Thus, a heretofore unaddressed need exists in the industry for a trimmable composite multilayer capacitor which exhibits a high quality factor Q, before and after trimming, and which is capable of efficient and accurate functional trimming over a wide range while in a circuit.

SUMMARY OF THE INVENTION

Briefly stated, the present invention is a trimmable composite multilayer capacitor and method for fabricating the same. The trimmable composite multilayer capacitor exhibits a high quality factor Q and is capable of efficient and accurate functional trimming over a wide range while in a circuit.

The method for fabricating the composite multilayer capacitor includes the following steps. A plurality of interleaved first and second electrodes are spaced apart by dielectric material, such as ceramic to define a capacitor body exhibiting a fixed capacitance. The capacitor body is sintered at a first temperature. A trimmable outermost electrode is then disposed on the external surface of the capacitor body. The trimmable outermost electrode is capable of depletion during functional trimming by, for example, a laser or an abrasive removal mechanism, for ultimately particularly selecting the capacitance of the capacitor body as a whole. The capacitor body is again sintered at a second temperature which is less than the first temperature. Finally, first and second terminations are disposed at respective first and second ends of the capacitor body. The first termination is connected to the first electrodes and to the trimmable outermost electrode, whereas the second termination is connected to the second electrodes. As a result of the first and second temperatures of sintering, the trimmable outermost electrode does not migrate into the underlying dielectric layer so that the trimmable composite multilayer capacitor is capable of efficient and accurate functional trimming over a wide range while in a circuit.

In accordance with a first embodiment of the present invention, a composite multilayer capacitor exhibiting a high quality factor Q and permitting efficient functional trimming over a wide range while in circuit comprises the following features. A capacitor body is defined by a plurality of interleaved first and second electrodes spaced apart by a dielectric material, such as a ceramic material. The plurality establishes a fixed capacitance. Moreover, the capacitor body is sintered at a first temperature. A trimmable outermost electrode on the capacitor body is capable of depletion during the functional trimming process by, for example, a laser or an abrasive removal mechanism, for ultimately particularly selecting the capacitance. The trimmable outermost electrode is sintered with the capacitor body at a second temperature which is less than the first temperature. Finally, first and second terminations are disposed at respective first and second ends of the capacitor body and are connected respectively to the first and second electrodes. Because of the first and second temperatures of sintering, the trimmable outermost electrode does not migrate into the underlying dielectric layer so that the composite multilayer capacitor is capable of efficient and accurate functional trimming over a wide range while in a circuit.

In accordance with a second embodiment of the present invention, a composite multilayer capacitor exhibiting a high quality factor Q and permitting efficient functional trimming over a wide range while in a circuit comprises the following features. A capacitor body is defined by a plurality of interleaved first and second electrodes spaced apart by a dielectric material, such as ceramic. The plurality establishes a fixed capacitance. A first termination is disposed at a first end of the capacitor body and is connected to the first electrodes. A second termination is exposed at a second end of the capacitor body and is connected to the second electrodes. A trimmable outermost electrode is exposed on the capacitor body and is connected to the first termination. The trimmable electrode is ultimately capable of depletion during the trimming process with, for example, a laser or an abrasive removal mechanism, so that the overall capacitance of the capacitor is selectable. Finally, and significantly, a solder barrier is situated externally over a portion of the trimmable electrode near the first termination to prevent solder from covering the trimmable electrode. As a result, trimming is not hindered by solder which may wick up over the trimmable outermost electrode during surface mounting of the capacitor.

Accordingly, an object of the present invention is to provide a method for fabricating a trimmable composite multilayer capacitor which exhibits a high quality factor Q, before and after functional trimming.

Another object of the present invention is to provide a method for fabricating a trimmable composite multilayer capacitor which is capable of efficient and accurate functional trimming over a wide range while in a circuit.

Another object of the present invention is to provide a method for preventing diffusion or migration of a trimmable outermost electrode into an underlying dielectric layer during fabrication of a trimmable composite multilayer capacitor.

Another object of the present invention is to provide a trimmable composite multilayer capacitor exhibiting a high quality factor Q, before and after functional trimming.

Another object of the present invention is to provide a trimmable composite multilayer capacitor which is capable of efficient and accurate functional trimming over a wide range while in a circuit.

Another object of the present invention is to provide a trimmable composite multilayer capacitor having a high volumetric efficiency.

Another object of the present invention is to provide a trimmable composite multilayer capacitor which can be surface mounted utilizing conventional high speed automated techniques and conventional soldering and attachment methods.

Another object of the present invention is to provide a trimmable composite multilayer capacitor which permits a functional trim over an appreciable capacitance range.

Another object of the present invention is to provide a trimmable composite multilayer capacitor which utilizes a dielectric material with a high dielectric constant relative to Class I dielectric materials.

Another object of the present invention is to provide a trimmable composite multilayer capacitor characterized by a capacitance which is very stable at high operating frequencies with respect to applied voltage, temperature, and life span.

Another object of the present invention is to provide a trimmable composite multilayer capacitor which is user friendly in that it can be easily trimmed by a user while the device resides in a circuit.

Another object of the present invention is to provide a trimmable composite multilayer capacitor which is inexpensive to manufacture, durable in structure, and efficient as well as reliable in operation.

Another object of the present invention is to provide a method and trimmable composite multilayer capacitor which prevents solder, placed on the terminations during the mounting process, from wicking up onto the trimmable outermost electrode and thereby interfering with the functional trimming process.

Other objects, features and advantages of the present invention will become apparent from the following description when considered in conjunction with the accompanying drawings.

BRIEF DESCRIPTION OF THE DRAWINGS

The present invention, as defined in the claims, can be better understood with reference to the following drawings. The drawings are not necessarily to scale, emphasis instead being placed upon clearly illustrating principles of the present invention.

DETAILED DESCRIPTION OF THE PREFERRED EMBODIMENTS

Figure 1:
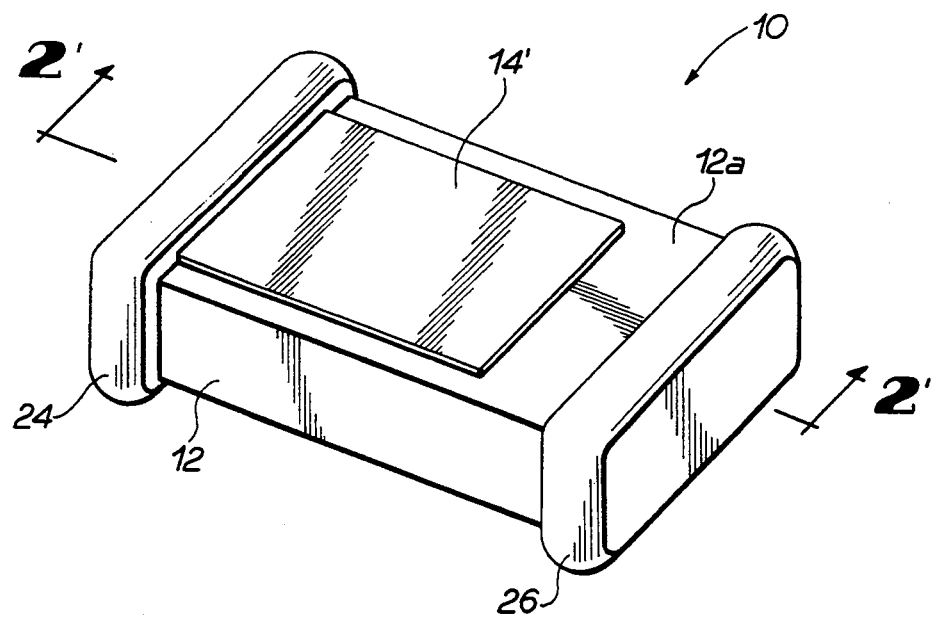
FIG. 1 is a perspective view of a first embodiment of a novel trimmable composite multilayer capacitor in accordance with the present invention.

With reference now to the figures wherein like numerals represent corresponding parts throughout the several views, a trimmable composite multilayer capacitor 10 in accordance with a first embodiment of the present invention is shown in FIG. 1. The composite multilayer capacitor 10 exhibits a high quality factor Q, before and after a functional trimming process, and permits efficient functional trimming over a wide range while in a circuit.

The composite multilayer capacitor 10 has a capacitor body 12 defining a fixed capacitance and has a trimmable outermost electrode 14' defining an adjustable capacitance which can be depleted so as to selectively modify the overall capacitance of the capacitor 10. The trimmable outermost electrode 14' is disposed on the outer surface of the capacitor body 12 and is adapted to be trimmed by any conventional trimming mechanism, for example, a laser or abrasive mechanism, so as to finely adjust or tune, with great accuracy and efficiency, the overall capacitance value of the composite multilayer capacitor 10.

Figure 2:
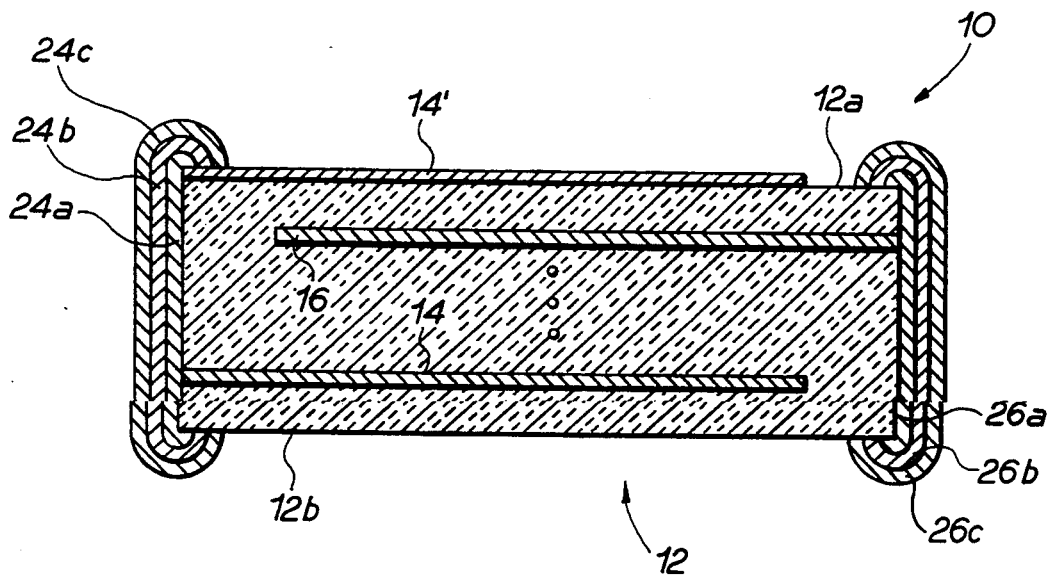
FIG. 2 is a cross-sectional view of the first embodiment shown in FIG. 1 taken along line 2'—2'.

The capacitor body 12 is created by a plurality of interleaved first and second ceramic layers having respective first and second electrodes 14, 16, shown in FIG. 2. There can be any number of first and second electrodes 14, 16, depending upon the ultimate capacitance which is desired. The first and second electrodes 14, 16 are connected respectively to first and second terminations 24, 26. In effect, the electrodes 14, 16 respond like a group of capacitors connected in electrical parallel between the terminations 24, 26. Moreover, the terminations 24, 26 can comprise one or more respective metallic layers 24a–24c, 26a–26c. The various metallic layers 26a–26c enhance product shelf-life and enhance product durability during soldering operations.

Figure 3A:
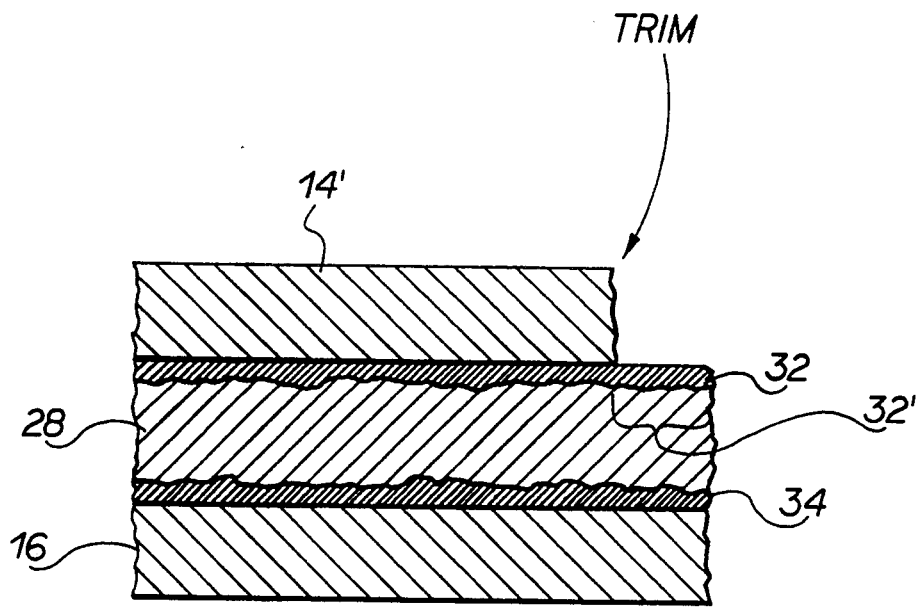
FIG. 3A is an exploded partial cross-sectional view of the top layers of a composite multilayer capacitor having undesirable diffusion of the trimmable outermost electrode into the underlying dielectric layer.

In general, the fabrication of the capacitor body 12, involves a lamination process. Ceramic sheets are obtained in green form. A thick film of a metallic electrode paste is then screen printed on the ceramic sheets. Next, the ceramic sheets are stacked, pressed, cut, and then sintered in a kiln. However, in order to achieve a trimmable composite multilayer capacitor which exhibits a high quality factor Q and which can be efficiently and accurately trimmed, the trimmable outermost electrode 14' should not be co-fired with the various layers of the capacitor body 12, for the following reasons. If the outermost electrode is co-fired with the various layers during the sintering process, as shown in FIG. 3A, metal from the electrodes 14', 16 undesirably diffuses into the adjacent, porous, dielectric layer 28. As a result, diffused regions 32, 34 of both electrode material and dielectric material resides between each substantially pure dielectric layer 28 and each substantially pure electrode layer 14', 16.

Because of the diffused region 32, the outermost electrode 14' cannot be accurately and efficiently trimmed during the trimming process. Specifically, as shown in FIG. 3A, after a portion of the outermost electrode 14' has been depleted via a laser or abrasive trimming system, a diffused region 32' remains behind. The diffused region 32' results in an inconsistent capacitance depletion and the possibility of a degradation to the quality factor Q of the capacitor 10, before and after the trimming operation. The reason is that after trimming, the diffused region 32' is a discontinuous, nonplanar, residual electrode layer or perhaps comprises a distribution of varying-sized islands of electrode material, resulting in stray capacitances of varying values. These varying stray capacitances call affect the linearity of capacitance depletion. Generally. a greater trimming power is required to remove the diffused region(s), but this greater power may significantly disrupt the dielectric layer 28 so that post-trimming quality factor Q is degraded and/or the capacitor reliability is jeopardized.

Furthermore, the trimming mechanism cannot be easily configured to accurately deplete the entire diffused region 32 because the diffused region 32 varies in depth. Further, if the power intensity of the trimming mechanism is increased too greatly, the dielectric layer 28 can be completely depleted thereby exposing the underlying electrode 16 and perhaps causing a short circuit.

Figure 3B:
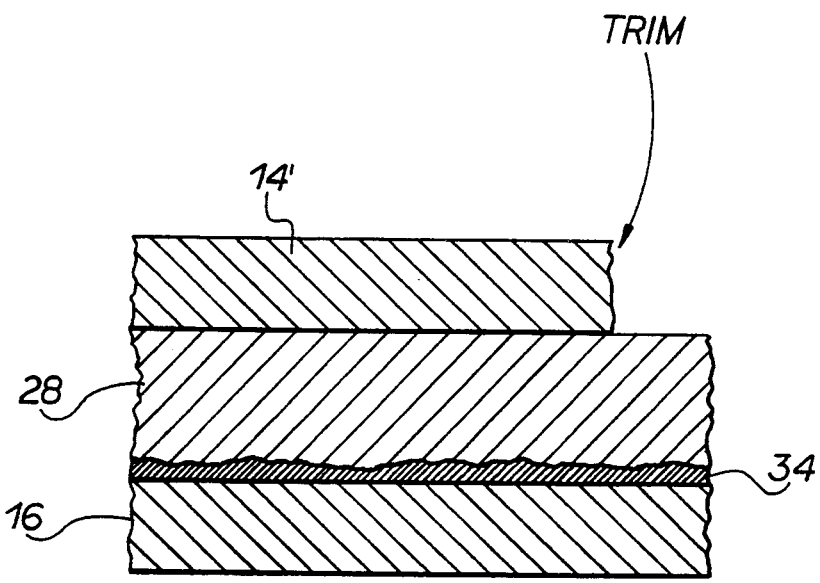
FIG. 3B is an exploded partial cross-sectional view of the top layers of the first embodiment shown in FIGS. 1 and 2.

FIG. 3B shows the first embodiment of the present invention wherein the trimmable outermost electrode 14' is affixed or bonded to the previously-sintered capacitor body 12 so that the outermost electrode 14' does not diffuse or migrate into the underlying dielectric layer 28 during the second, low temperature, sintering process. As a results, when the outermost electrode 14' is trimmed, the metal which is concentrated strictly on the top surface of the capacitor body 12 is more accurately and efficiently eliminated, thereby resulting in very precise adjustment of the capacitance.

Figure 4:
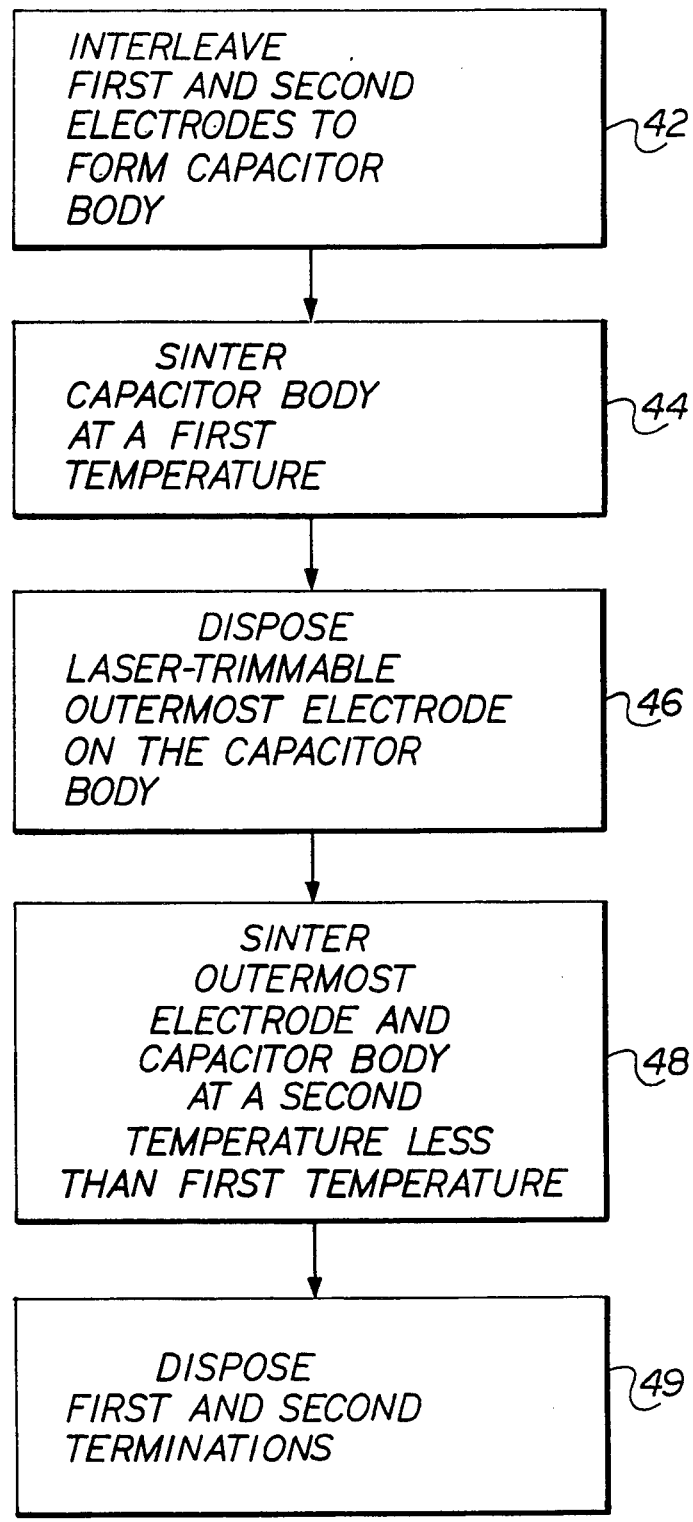
FIG. 4 is a flow chart illustrating a novel process for fabricating the first embodiment of FIGS. 1, 2, and 3B.

The novel process for fabricating the first embodiment of the present invention is illustrated in FIG. 4 and is described in detail hereafter. First, as indicated in flow chart block 42, the first and second electrodes 14, 16 are screen printed as metal pastes onto 1.5 mil sheets of dielectric ceramic in green form. These layers are stacked, pressed, and cut.

Next, as indicated in flow chart block 44, the stacked layers are sintered together in a kiln at a temperature approximately between 1200°–1400° C. In the preferred embodiment, the stacked layers are sintered at about 1350° C.

Further, as indicated in flow chart block 46, the trimmable outermost electrode 14' is screen printed as a thick film paste onto the outer surface 12a of the capacitor body 12. It should be noted that the outermost electrode 14' may be applied to the capacitor body 12 via any thin film process (for example, plating) or any thick film process (for example, sputtering or chemical vapor deposition, or CVD).

The combination of the trimmable outermost electrode 14' and the capacitor body 12 are then sintered at a second temperature which bonds the outermost electrode 14' to the capacitor body 12 but does not permit migration or diffusion of the electrode metal into the underlying dielectric layer 28. In order to accomplish this result, the second temperature is adjusted so that it is less than the first temperature. In the preferred embodiment, the second temperature measures approximately between 800°–900° C. Sintering the foregoing combination within the preceding temperature range will result in the desired, mutually exclusive, layer configuration shown in FIG. 3B.

Finally, as indicated in flow chart block 49, the first and second terminations 24, 26 are disposed at respective first and second ends of the capacitor body 12. In the foregoing process, the first termination 24 is connected to the first electrodes 14 and to the trimmable outermost electrode 14', whereas the second termination 26 is connected to the second electrodes 16. Preferably, the terminations 24, 26 comprise one or more metallic layers, including for example nickel and/or tin. In the preferred embodiment, a silver or silver alloy layer 26a is applied via a dipping and-sintering process. Next, a nickel or nickel alloy layer 26b is applied via a plating process. Finally, a tin or tin alloy layer 26c is applied via a plating process. The various metal layers 26a–26c enhance product shelf-life and enhance product durability during soldering operations.

Because the outermost electrode 14' is applied without a diffused region 32, the post-trimming quality factor Q of the capacitor 10 is optimized. As a result, a particular threshold for the quality factor Q can be achieved even by using a dielectric material having a higher dielectric constant K, contrary to the trend in the industry. In fact, a dielectric material having a high dielectric constant K relative to Class I dielectric materials may be utilized. In the preferred embodiment, a dielectric material having, for example, neodymium titanate ceramic with a dielectric constant K=60 is preferred. Significantly, because a dielectric material having a high dielectric constant K can be utilized, the thickness of the dielectric layers can be increased, thereby resulting in greater reliability and the volumetric efficiency of the composite multilayer capacitor 10 is substantially enhanced. As a further result, the trimming range of the multilayer capacitor 10 is increased.

It should be emphasized that the trimmable composite multilayer capacitor 10 could be created with an even higher quality factor Q by using a dielectric material having a low dielectric constant K. For example, the dielectric layers of the capacitor 10 could be made of magnesium titanate ceramic, calcium titanate ceramic, combinations of both of the foregoing materials, or any other materials which exhibit a low dielectric constant K.

Figure 5:
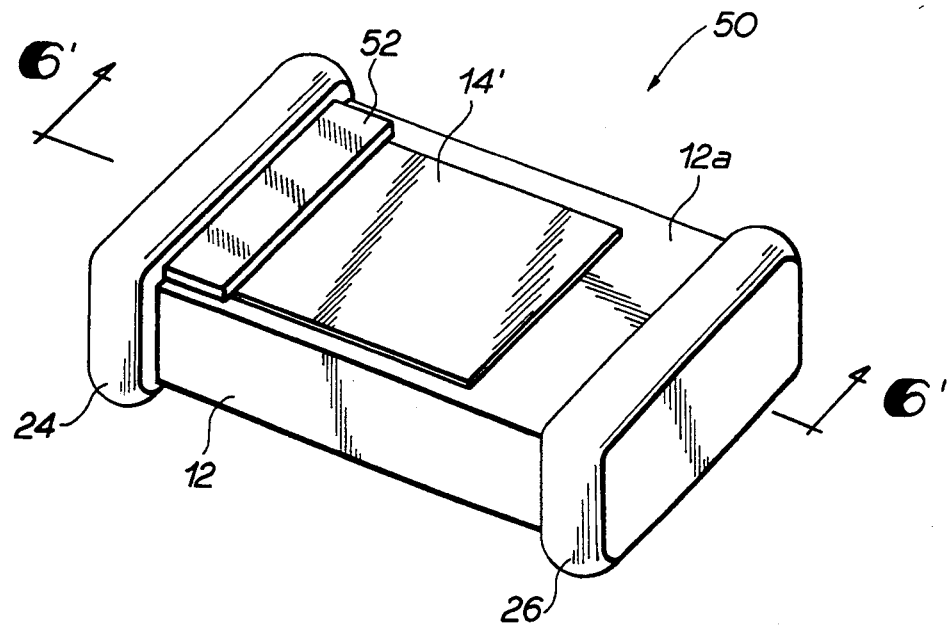
FIG. 5 illustrates a perspective view of a second embodiment of the present invention.
Figure 6:
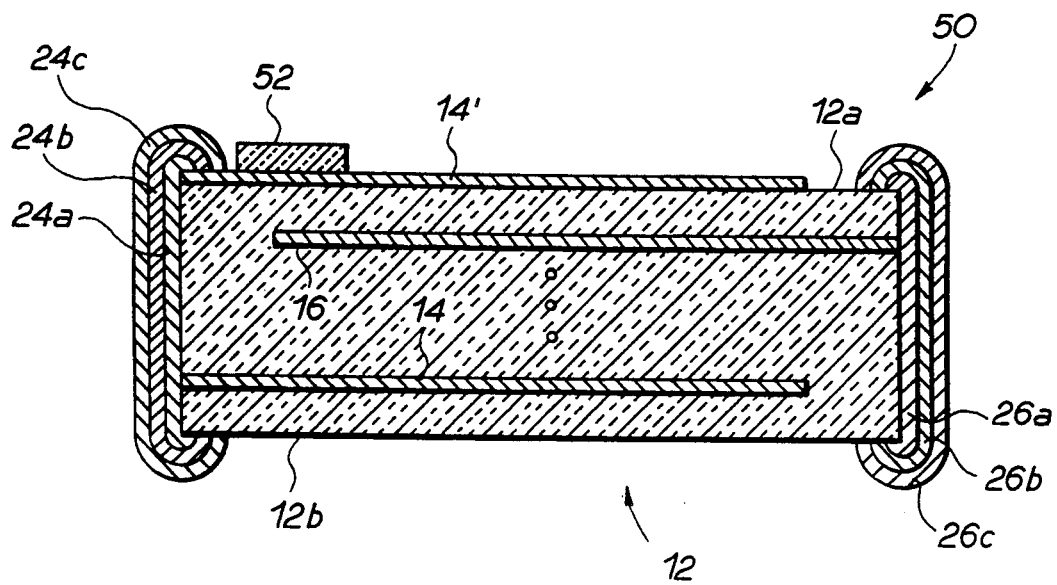
FIG. 6 is an exploded cross-sectional view of the second embodiment of FIG. 5 taken along line 6'—6'.

A perspective view of a second embodiment of the present invention is illustrated in FIG. 5. In the second embodiment, a solder barrier 52 is situated externally over a portion of the trimmable outermost electrode 14' near the first termination 24 to prevent solder from covering the trimmable outermost electrode 14' during surface mounting of the composite multilayer capacitor 50. A cross-sectional view of the solder barrier 52 is shown in FIG. 6 for a clearer understanding of the profile of the structure.

The solder barrier 52 is fabricated on the composite multilayer capacitor 50 after the capacitor body 12 and outermost electrode 14' have been disposed and sintered, but before fabricating the terminations 24, 26. The solder barrier 52 may be implemented on a composite multilayer capacitor of conventional design where the outermost electrode 14' is co-fired along with the rest of the capacitor body 12, or also can be implemented in the first embodiment of the present invention wherein the outermost electrode 14' is applied to the capacitor body 12 in a different sintering process at a lower temperature.

In order to dispose the solder barrier 52 on the capacitor body 12, the solder barrier 52 is preferably screen printed as a thick film paste onto a portion of the outermost electrode 14'. The structure is then sintered in a kiln at a temperature approximately between 800°–900° C. The temperature cannot be much higher than the foregoing range or else the integrity of the electrode and dielectric layers will be adversely affected, as previously discussed. Finally, the terminations 24, 26 are applied at the ends of the capacitor body 12 via one or more dipping and/or plating processes as previously described.

It will be obvious to those skilled in the art that many variations may be made to the preferred embodiments described above without departing from the novel teachings of the present invention. For example, the capacitor 10 can be created using dielectric materials having a lower dielectric constant K in order to achieve a capacitor with an even greater quality factor Q. As another example, the trimmable outermost electrode 14' may be applied using some other thick or thin film process, not the thick film screen printing process as described above. All such variations are intended to be incorporated herein and within the scope of the following claims.

What is claimed is:

1. A method for fabricating a trimmable composite multilayer capacitor exhibiting a high quality factor Q and capable of efficient functional trimming over a wide range while in a circuit, comprising the steps of:
    configuring a plurality of interleaved first and second electrodes spaced apart by dielectric material to define a capacitor body exhibiting a fixed capacitance;
    sintering said capacitor body at a first temperature;
    disposing a trimmable outermost electrode on said capacitor body capable of depletion for particularly selecting an overall capacitance of said capacitor;
    sintering the combination of said trimmable outermost electrode and said capacitor body at a second temperature which is less than said first temperature and which prevents substantial migration of said trimmable outermost electrode into an underlying dielectric layer of said capacitor body; and
    disposing first and second terminations at respective first and second ends of said capacitor body, said first termination being connected to said first electrodes and to said trimmable outermost electrode, said second termination being connected to said second electrodes.

2. The method of claim 1, further comprising the step of applying said trimmable outermost electrode via a thick film process.

3. The method of claim 1, wherein said capacitor exhibits a quality factor Q before functional trimming which is greater than 100 at an operating frequency of about 400 MHz or less.

4. The method of claim 1, wherein said dielectric material comprises neodymium titanate ceramic.

5. The method of claim 1, wherein said dielectric material comprises magnesium titanate ceramic.

6. The method of claim 1, wherein said dielectric material has a high dielectric constant relative to Class I dielectric materials.

7. The method of claim 1, further comprising the step of positioning a solder barrier externally over a portion of said trimmable electrode near said first termination to prevent solder from covering said trimmable electrode.

8. The method of claim 1, wherein said first temperature ranges approximately between 1200 and 1400 degrees celsius.

9. The method of claim 6, wherein said constant is approximately 60.

10. The method of claim 7, further comprising the steps of:
    screen printing said solder barrier in paste form over said trimmable electrode; and
    sintering said solder barrier at a temperature approximately between 800 and 900 degrees celsius.

11. The method of claim 8, wherein said second temperature ranges approximately between 800 and 900 degrees Celsius.

12. The method of claim 1, wherein said dielectric material comprises calcium titanate ceramic.

13. A trimmable composite multilayer capacitor exhibiting a high quality factor Q and permitting efficient functional trimming over a wide range while in a circuit, comprising:
    a capacitor body defined by a plurality of interleaved first and second electrodes spaced apart by dielectric material, said plurality for establishing a fixed capacitance, said capacitor body being sintered at a first temperature;
    a trimmable outermost electrode on said capacitor body capable of depletion for particularly selecting an overall capacitance of said capacitor, said trimmable outermost electrode being sintered with said capacitor body at a second temperature which is less than said first temperature and which prevents substantial migration of said trimmable outermost electrode into an underlying dielectric layer of said capacitor body; and
    first and second terminations at respective first and second ends of said capacitor body, said first termination being connected to said first electrodes and to said trimmable outermost electrode, said second termination being connected to said second electrodes.

14. The capacitor of claim 13, wherein said trimmable outermost electrode comprises a thick film layer.

15. The capacitor of claim 13 exhibiting a quality factor Q before trimming which is greater than 100 at an operating frequency of about 400 MHz or less.

16. The capacitor of claim 13, wherein said dielectric material comprises neodymium titanate ceramic.

17. The capacitor of claim 13, wherein said dielectric material comprises magnesium titanate ceramic.

18. The capacitor of claim 13, wherein said dielectric material comprises a high dielectric constant relative to Class I dielectric materials.

19. The capacitor of claim 13, wherein said first temperature ranges approximately between 1200 and 1400 degrees Celsius.

20. The capacitor of claim 16, wherein said constant is approximately 60.

21. The capacitor of claim 19, wherein said second temperature ranges approximately between 800 and 900 degrees Celsius.

22. The capacitor of claim 13, wherein said dielectric material comprises calcium titanate ceramic.

23. A trimmable composite multilayer capacitor exhibiting a high quality factor Q and permintting efficient functional trimming over a wide range while in a circuit, comprising:
    a capacitor body defined by a plurality of interleaved first and second electrodes spaced apart by dielectric material, for establishing a fixed capacitance;
    first and second terminations at respective first and second ends of said capacitor body, and connected respectively to said first and second electrodes;
    a trimmable outermost electrode on said capacitor body connected to said first termination, said outermost electrode capable of depletion so that the overall capacitance of said capacitor is selectable, said outermost electrode being sintered to said capacitor body at a temperature which prevents substantial migration of said outermost electrode into an underlying dielectric layer; and
    a solder barrier situated externally over said outermost electrode near said first termination to prevent solder from covering said outermost electrode to optimize trimmability.

24. The capacitor of claim 23, wherein said solder barrier is sintered at a temperature approximately between 800 and 900 degrees celsius.

* * * * *

UNITED STATES PATENT AND TRADEMARK OFFICE
CERTIFICATE OF CORRECTION

PATENT NO. : 5,347,423
DATED : September 13, 1994
INVENTOR(S) : deNeuf, et al

It is certified that error appears in the above-indentified patent and that said Letters Patent is hereby corrected as shown below:

On the title page, item [56]: delete "Orgata" and insert --Ogata--

Column 4, line 27, delete "trimrnable" and insert --trimmable--

Column 6, line 62, delete "call" and insert --can--
Column 10, line 28, delete "neodyrnium" and insert --neodymium--
         line 37, delete "16" and insert --18--

Signed and Sealed this

Twenty-ninth Day of November, 1994

Attest:

BRUCE LEHMAN

*Attesting Officer*     *Commissioner of Patents and Trademarks*